(12) United States Patent
Barcelo et al.

(10) Patent No.: US 11,118,974 B2
(45) Date of Patent: Sep. 14, 2021

(54) SPECTROSCOPIC DEVICE INCLUDING DESIGN GROUPS

(71) Applicant: Hewlett-Packard Development Company, L.P., Spring, TX (US)

(72) Inventors: Steven Barcelo, Palo Alto, CA (US); Anita Rogacs, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/611,968

(22) PCT Filed: Jul. 19, 2017

(86) PCT No.: PCT/US2017/042865
§ 371 (c)(1),
(2) Date: Nov. 8, 2019

(87) PCT Pub. No.: WO2019/017939
PCT Pub. Date: Jan. 24, 2019

(65) Prior Publication Data
US 2021/0080323 A1    Mar. 18, 2021

(51) Int. Cl.
*G01J 3/44*  (2006.01)
*G01N 21/64* (2006.01)
*G01N 21/65* (2006.01)

(52) U.S. Cl.
CPC .......... *G01J 3/4406* (2013.01); *G01N 21/648* (2013.01); *G01N 21/658* (2013.01)

(58) Field of Classification Search
CPC ....... G01J 3/4406; G01J 21/648; G01J 21/658
See application file for complete search history.

(56) References Cited

U.S. PATENT DOCUMENTS

| 7,321,422 B2 * | 1/2008 | Li | G01N 21/658 |
| | | | 356/301 |
| 8,767,202 B2 | 7/2014 | Schmidt et al. | |
| 9,310,306 B2 | 4/2016 | Li et al. | |

(Continued)

FOREIGN PATENT DOCUMENTS

| CN | 103026298 | 4/2013 |
| CN | 103439277 | 12/2013 |

(Continued)

OTHER PUBLICATIONS

Li, Yang, et al., "Wafer Scale Fabrication of Dense and High Aspect Ratio Sub-50 nm Nanopillars From Phase Separation of Cross-Linkable Polysiloxane/Polystyrene Blend," ACS applied materials & interfaces 9, No. 15 (Mar. 31, 2017): 13685-13693.

(Continued)

*Primary Examiner* — Dominic J Bologna
(74) *Attorney, Agent, or Firm* — Tong Rea Bentley & Kim LLC

(57) ABSTRACT

A spectroscopic device is provided. The spectroscopic device includes a plurality of design groups on a substrate. Each design group includes a plurality of collapsed groups separated by bare regions of substrate, wherein the edges of each design group is configured to enhance the pinning of a solvent drying line at the edge of the design group. Each collapsed group comprises at least 2 flexible columnar structures, and each flexible columnar structure comprises a metal cap.

12 Claims, 10 Drawing Sheets

(56) References Cited

U.S. PATENT DOCUMENTS

| | | | |
|---|---|---|---|
| 9,594,022 B2 | 3/2017 | Li et al. | |
| 2013/0278928 A1 | 10/2013 | Mourey et al. | |
| 2014/0009758 A1* | 1/2014 | Li | B05D 3/007 |
| | | | 356/301 |
| 2014/0375990 A1* | 12/2014 | Williams | G01J 3/44 |
| | | | 356/301 |
| 2015/0065390 A1* | 3/2015 | Bratkovski | G01N 21/658 |
| | | | 506/12 |

FOREIGN PATENT DOCUMENTS

| | | |
|---|---|---|
| CN | 104220878 | 12/2014 |
| WO | WO-2012128773 | 9/2012 |

OTHER PUBLICATIONS

Tawfick, Sameh H. et al., "Three-dimensional Lithography by Elasto-capillary Engineering of Filamentary Materials," Mrs Bulletin 41, No. 2 (Feb. 2016): 108-114.

Kondo, Toshiaki et al. "Sers in ordered array of geometrically controlled nanodots obtained using anodic porous alumina"; The Journal of Physical Chemistry C., vol. 117, No. 6, Dec. 6, 2012, pp. 2531-2534.

Zhu, Zhening et al. "Superstructures and SERS properties of gold nanocrystals with different shapes"; Angewandte Chemie International Edition; vol. 50, No. 7, Jan. 5, 2011, pp. 1593-1596.

* cited by examiner

<u>802</u>

<u>808</u>

SPECTROSCOPIC DEVICE INCLUDING DESIGN GROUPS

BACKGROUND

Sensors may be constructed that are based on intense local electric fields generated by the plasmon resonance of nanoscale metal particles. One type of sensor uses the plasmon resonance of adjacent metallic nanoparticles separated by a narrow gap on the nm scale. The nm-scale gap is generated by the collapse of flexible nanopillars that include a metal cap into collapsed groups. The collapse of the flexible nanopillars is induced by microcapillary forces from an evaporating fluid. To enhance the reliability of the collapse, the pillars are fabricated out of high aspect ratio pillars, which can create fabrication and materials challenges. Thus, enhanced techniques for controlling the collapse are needed.

DESCRIPTION OF THE DRAWINGS

Certain exemplary embodiments are described in the following detailed description and in reference to the drawings.

DETAILED DESCRIPTION

Previous studies have determined that a strong enhancement in surface enhanced luminance may be obtained from metal-capped polymer shafts, herein termed nanopillars, that are collapsed into groups, termed collapsed groups herein. The enhancement is based on intense local electric fields generated by the plasmon resonance of adjacent metal caps at the top of the collapse to nanopillars which are separated by a narrow gap on the nm scale. The collapse is induced by microcapillary forces from an evaporating fluid. To ensure reliable collapse, the pillars are fabricated out of high aspect ratio pillars, which can create fabrication and materials challenges.

However, control of the collapse may be difficult, with some collapsed groups including only two nanopillars and other collapsed groups including three, four, or five nanopillars, or more. Having a more regular distribution and more nanopillars in each collapsed group may enhance the spectroscopic signal.

A method of patterning the arrangement of the nanopillars to take advantage of solvent pinning during fluid evaporation is described herein. The solvent pinning may delay the movement of a contact line into a field of nanopillars, allowing the level of solvent within the nanopillars to drop further before the contact line moves through the nanopillars, encouraging the collapse of adjacent nanopillars.

A number of pillar layouts, termed design groups herein, are disclosed to make use of the solvent pinning at pattern boundaries to increase the yield of collapsed structures. This may enable the use of shorter pillars, stiffer materials or a wider range of solvents to induce collapse. The new layouts are based on the observation that solvent pinning of the contact line at the edge of patterned regions may lead to more uniform collapse behavior at the edge than in the center. The shape of the patterned region can also influence contact line pinning and the direction of closure.

Although examples herein focus on the use of the flexible nanopillars, any number of other flexible columnar structures made using various techniques may be used in the design groups. These may include flexible columnar structures grown as nano-wires, conical structures formed by vapor etching, or any number of other structures formed using techniques described with respect to FIGS. 1 and 2.

Figure 1:
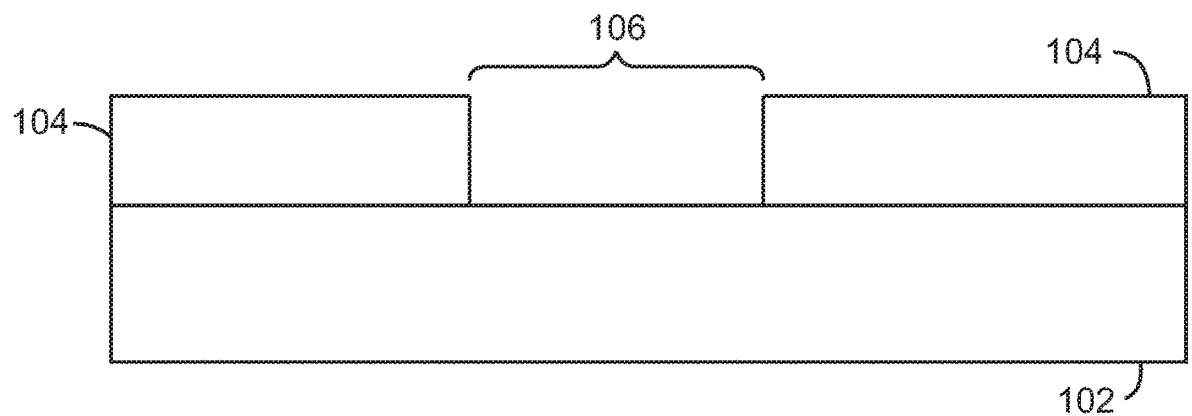
FIG. 1 is a drawing of an example of a substrate supporting a column layer for the formation of flexible nanopillars.

FIG. 1 is a drawing of an example of a substrate 102 supporting a column layer 104 for the formation of flexible nanopillars. The substrate 102 may be made from silicon, glass, quartz, silicon nitride, sapphire, aluminum oxide, diamond, diamond-like carbon, or other rigid inorganic materials, such as metals and metallic alloys. In some examples, the substrate 102 may be a polymeric material, such as a polyacrylate, a polyamide, a polyolefin, such as polyethylene, polypropylene, or a cyclic olefin, a polycarbonate, polyesters such as polyethylene terephthalate, polyethylene napthalate, or other polymeric material suitable for making films. Any of these polymeric materials may be a copolymer, a homopolymer, or combination thereof. The substrate 102 may be a web used in a roll-to-roll fabrication process.

Figure 2:
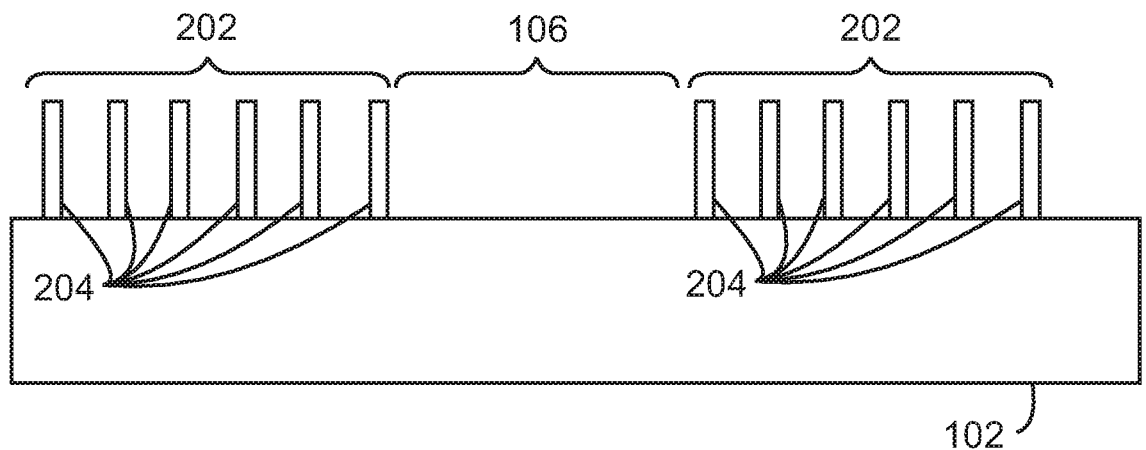
FIG. 2 is a drawing of an example of two design groups of flexible nanopillars formed on the substrate.

The column layer 104 may be a polymeric material that can be formed into columns by any number of processes, such as described with respect to FIG. 2. Polymeric materials that may be used include but are not limited to, photo resists, hard mold resins such as PMMA, soft mold polymers such as PDMS, ETFE or PTFE, or hybrid-mold crosslinked, uv-curable or thermal-curable, polymers based on acrylate, methacrylate, vinyl, epoxy, silane, peroxide, urethane or isocyanate. The polymer materials may be modified to improve imprint and mechanical properties with copolymers, additives, fillers, modifiers, photoinitiators, and the like. Any of the materials mentioned with respect to the substrate 102 may also be used. A column layer 104 does not have to be used to form the nanopillars. In some examples, the substrate 102 may form the column layer 104, while in other examples, the nanopillars may be directly formed on the substrate 102.

A bare region of substrate 106 may be left between regions of the column layer 104. These regions may provide separations used in the forming of design groups.

FIG. 2 is a drawing of an example of two design groups 202 of flexible nanopillars 204 formed on the substrate 102.

Like numbered items are as described with respect to FIG. 1. The flexible nanopillars 204 may be formed from a column layer 104 (as described with respect to FIG. 1) on the surface of the substrate 102 by any number processes, including nano-embossing, lithography followed by reactive ion etching or chemical etching, and the like. In a nano-embossing process, a column layer may be softened and then run through a die to imprint the flexible nanopillars 204. Any number of other processes known in the art may be used to form the flexible nanopillars 204 from a column layer 104. Further, the column layer 104 may be part of the substrate 102 and lithographic and other etching techniques may be used.

In some examples, the flexible nanopillars 204 may be deposited on the substrate 102, for example, using nano-printing, ion deposition techniques, and the like. In a nano-printing process, the materials forming the flexible nanopillars 204 may be directly deposited, or printed, on the surface of the substrate 102. In other examples, nano-wires may be grown on the substrate through ion deposition. In growing the nano-wires to produce the flexible column, nano-wire seeds may be deposited onto the substrate 102. The nano-wire seeds may be silicon nano-structures, and the nano-wires may be silicon dioxide structures grown during chemical vapor deposition from silane. Once the flexible nanopillars 204 are formed, metal caps may be formed over the nanopillars.

Figure 3:
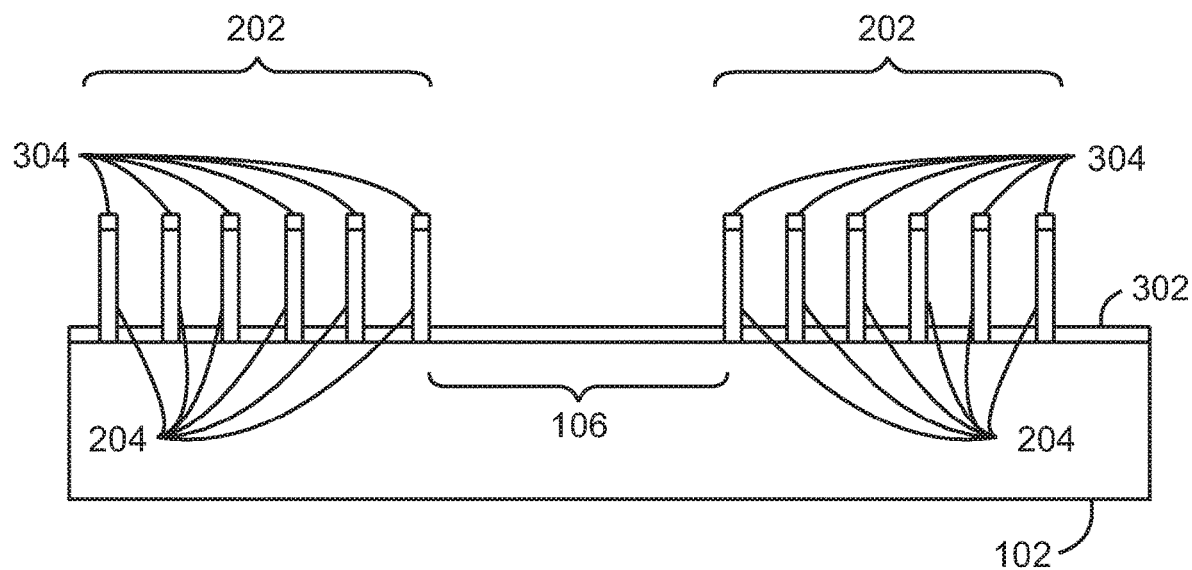
FIG. 3 is a drawing of an example of a metal layer deposited over the flexible nanopillars and the substrate, forming metal caps at the top of each of the flexible nanopillars.

FIG. 3 is a drawing of an example of a metal layer 302 deposited over the flexible nanopillars 204 and the substrate 102, forming metal caps 304 at the top of each of the flexible nanopillars 204. Like numbered items are as described with respect to FIGS. 1 and 2. The metal caps 304 may include noble metals, such as ruthenium (Ru), rhodium (Rh), palladium (Pd), silver (Ag), osmium (Os), iridium (Ir), platinum (Pt), and gold (Au), as well as copper, or alloys thereof. Other metals may be used in the metal caps 304, such as aluminum (Al), titanium (Ti), or other metals. The metal layer may be deposited using a thin-film vacuum-apparatus to deposit metal onto the flexible nanopillars 204. The metal may be deposited at an angle of about 30° to a surface of the substrate 102 to enhance formation of the metal caps 304, while decreasing the amount of metal deposited in other locations, such as in the metal layer 302 over the substrate 102. The material deposited from the metallic vapor may also be limited to control the deposition, and lower the amount deposited on the substrate 102 or on sides of the flexible nanopillars 204.

Other techniques may be used to form the metal caps. In some examples, the substrate 102 including the flexible nanopillars 204 may be immersed in a plating solution that includes metal cations. An electric potential applied to the substrate 102 may cause deposition of metal at the top of the flexible nanopillars 204, as the top of the flexible nanopillars 204 may have a more concentrated or enhanced electrical field. Further, in some examples, metallic caps can be precipitated from colloidal suspensions of metallic nanoparticles when an electric potential is applied to the substrate 102. Any number of other techniques may be used to form the metal caps.

Figure 4:
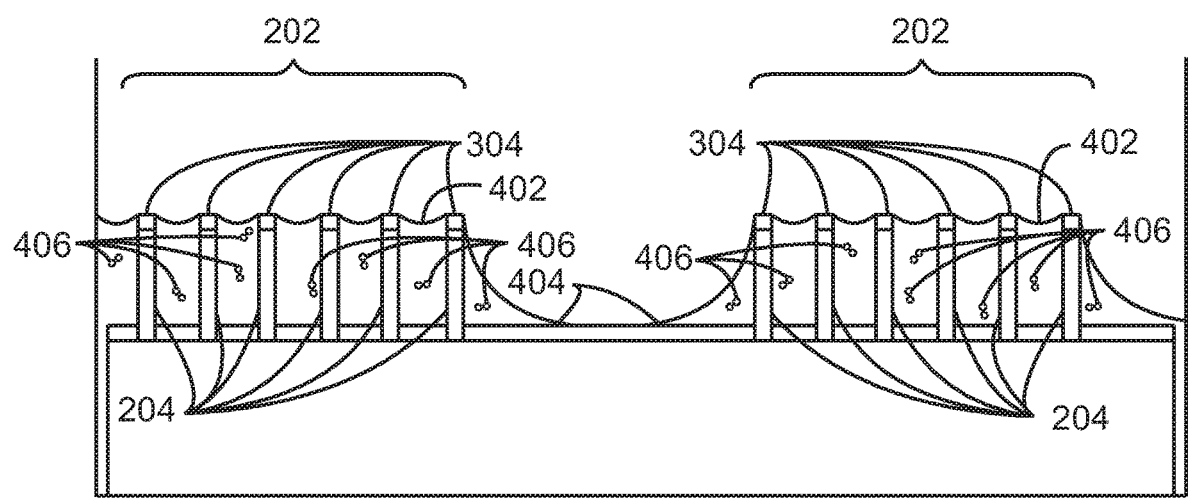
FIG. 4 is a schematic drawing of an example of the evaporation of a fluid over the design groups, showing the effect of solvent pinning at the edge of the design groups.

FIG. 4 is a schematic drawing of an example of the evaporation of a fluid 402 over the design groups 202, showing the effect of solvent pinning 404 at the edge of the design groups. Like numbered items are as described with respect to FIGS. 1, 2, and 3. Evaporation of the 402 fluid causes flexible nanopillars 204 that are adjacent to collapse, bringing the metal caps 304 at the tips together. Analyte molecules 406, present in the fluid 402, may be adsorbed on the surfaces of the metal caps 304, or may be trapped in the nm-scale gaps between the metal caps 304.

The solvent pinning 404 tends to hold the contact line of the fluid 402 in place during the evaporation process, increasing the amount of fluid 402 evaporated from the design groups 202. The increase in the evaporation of the fluid 402 in the design groups 202 may improve control over the collapse process.

Figure 5:
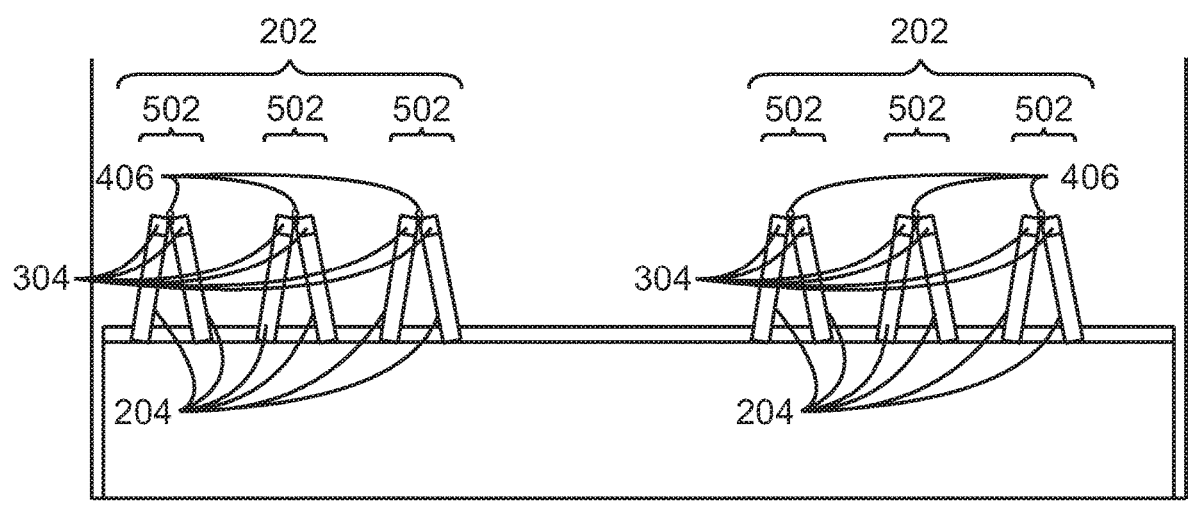
FIG. 5 is a drawing of an example of collapsed groups in each of the design groups.

FIG. 5 is a drawing of an example of collapsed groups 502 in each of the design groups 202. Like numbered items are as described with respect to FIGS. 1 to 4. As described with respect to FIG. 4, the solvent pinning of an evaporating fluid outside of a design group 202 may increase evaporation of the fluid within the design group 202. This may increase the microcapillary pressure within the design group 202, which may increase the number of flexible nanopillars 204 in each collapsed group 502 and may make the collapsed groups 502 more consistent across the design group 202. This is discussed further with respect to FIG. 6.

Figure 6:
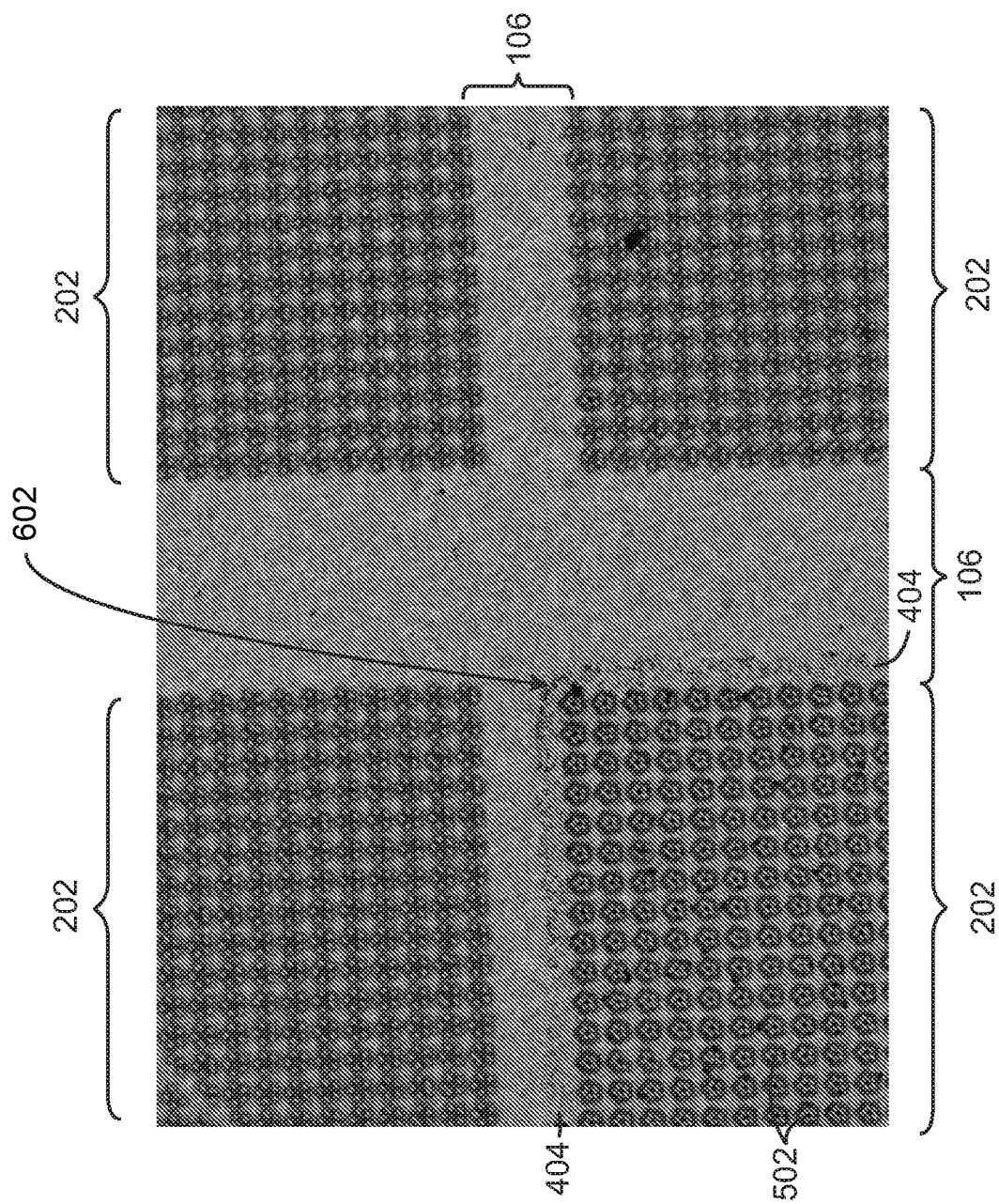
FIG. 6 is a micrograph of an example of solvent pinning controlling the formation of the collapsed groups.

FIG. 6 is a micrograph of an example of solvent pinning 404 controlling the formation of the collapsed groups 502. Like numbered items are as described with respect to FIGS. 1, 2, 4, and 5. In this example, the design groups 202 include a series of square patterns. The contact line, or evaporation line of the fluid, was moving from the upper right region of the micrograph to the lower left region of the micrograph. For simplicity, not every collapsed group is labeled in FIG. 6.

The solvent pinning 404 occurred as the contact line reached the lower left design group 202. This may have occurred as the contact line approached the upper right corner 602 of the lower-left design group 202 at a sharp angle. Solvent pinning 404 may not have occurred for the other design groups in this micrograph as the contact line approached those design groups 202 at a shallower angle.

As a result, the collapsed groups 502 in the lower left design group 202 show increased regularity, for example, with five metal caps 304 (as described with respect to FIGS. 3 to 5) in each collapsed group 502. This indicates that the collapse process may be controlled by creating design groups 202 that have sharp corners at the edge of bare regions of substrate 106. The example shown in the micrograph of FIG. 6.

The ability to control the collapse process may provide a number of advantages over current processes, in addition to providing more regular collapsed groups 502. For example, the solvent pinning 404 may allow the use of a larger number of different solvents, such as solvents that have higher rates of evaporation. For example, these solvents may not provide collapsed groups 502 with consistent formation without the use of the design groups 202. Further, the use of design groups 202 may allow the use of shorter pillars, or stiffer materials, among other advantages.

The micrograph of FIG. 6 indicates that the design or layout of the design groups 202 may be used to increase the solvent pinning 404. Potential layouts for the design groups 202 to improve control over the collapse process are discussed with respect to FIGS. 7 and 8. The layouts may use solvent pinning 404 at the edges or corners of the design groups 202 to increase the yield of collapsed groups 502.

Figure 7A:
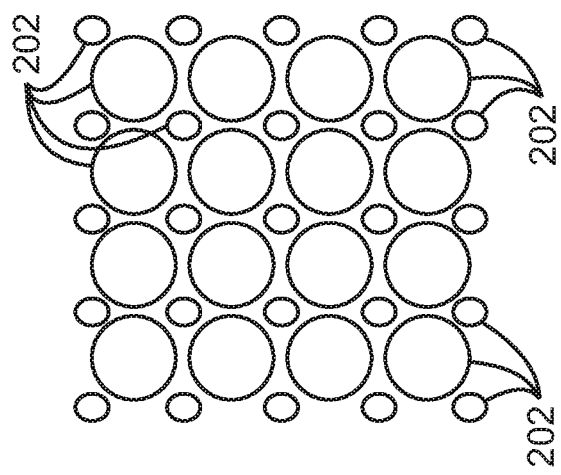
FIGS. 7(A) to 7(C) are drawings of examples of potential layouts for design groups that may increase collapse of nanopillars during fluid evaporation.
Figure 7B:
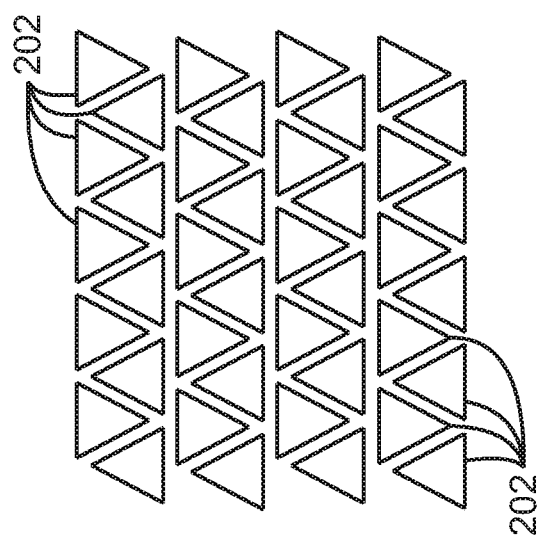
Figure 7C:
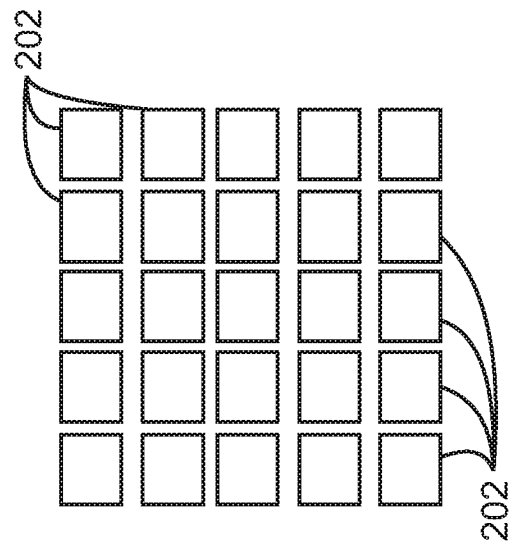

FIGS. 7(A) to 7(C) are drawings of examples of potential layouts for design groups 202 that may increase collapse of nanopillars during fluid evaporation. Like numbered items are as described with respect to FIG. 2. It may be noted that each design group 202 is made up of a large number of nanopillars, separated by a bare region of substrate. To simplify the figures, not every design group 202 is labeled.

FIG. 7(A) is a drawing of an array of design groups 202 including large circles interspersed with smaller circles that increase surface coverage. The radii of the large circles may be about 50 to 500 micrometers (μm), to match the observations of surface area of controlled collapse determined from previous studies. The radii of the smaller circles may be about 10 to 25 μm. This layout may be useful in examples in which the direction of contact line movement is unknown or uncontrolled.

FIG. 7(B) is a drawing of an array of design groups 202 including interlacing triangles. The use of the triangles may increase the number of corner areas that may help to pin the contact line. To enhance the collapse of the nanopillars, a series of exposures to solvents may be used, wherein an external factor such as gravity or temperature gradients may drive the direction of contact line movement.

FIG. 7(C) is a drawing of an array of design groups 202 including squares. As described with respect to the circles of FIG. 7(A), the sides of the squares may be 50 to 500 μm to match may be as observations. The squares may have less area dedicated to spacing than the triangular layout, but may also provide fewer corners that enhance solvent pinning. As for the triangles, the direction of the contact line movement may be important in controlling the collapse. This may be seen in the array of squares shown in the micrograph of FIG. 6 in which solvent pinning was a significant effect for only one of the four squares.

The design groups 202 do not have to be totally separate from each other. In some examples, designs may be join together to provide corner shapes to enhance pinning while keeping larger areas covered in the nanopillars, as described further with respect to FIG. 8.

Figure 8A:
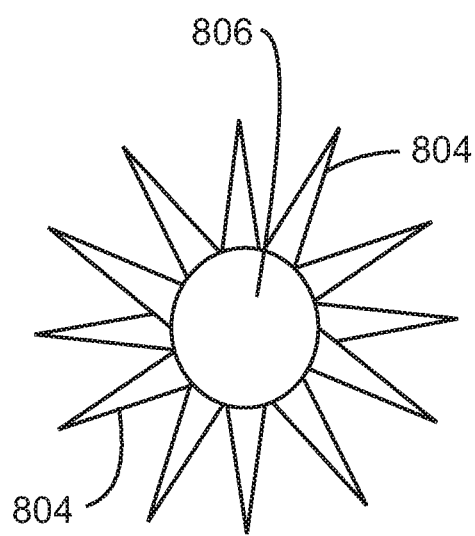
FIGS. 8(A) and 8(B) are drawings of examples of joined design groups that may increase pillar collapse during fluid evaporation.
Figure 8B:
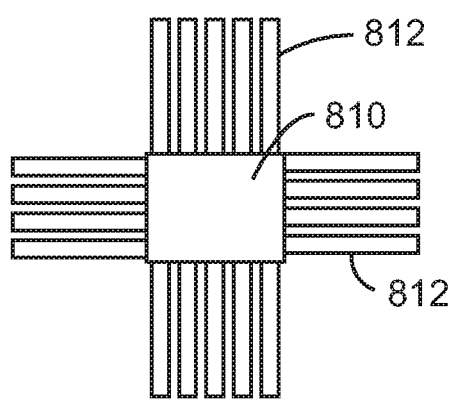

FIGS. 8(A) and 8(B) are drawings of examples of joined design groups that may increase pillar collapse during fluid evaporation. The star pattern 802 of FIG. 8(A) provides a number of triangular corner shapes 804 projecting from a circular center region 806. The corner shapes 804 may enhance the pinning and may control the collapse across the circular region 806. The number of triangular corner shapes 804, and the size of the triangular corner shapes 804, may be adjusted to further enhance the collapse process.

FIG. 8(B) is a drawing of another joined design group 808, in which a central square shape 810 has a number of rectangular projections 812. The rectangular projections 812 may enhance the solvent pinning and control the collapse across the square shape 810 in the center. As for the star pattern 802, the number of rectangular projections 812, and the size of the rectangular projections 812, may be adjusted to further enhance control of the collapse process.

Figure 9:
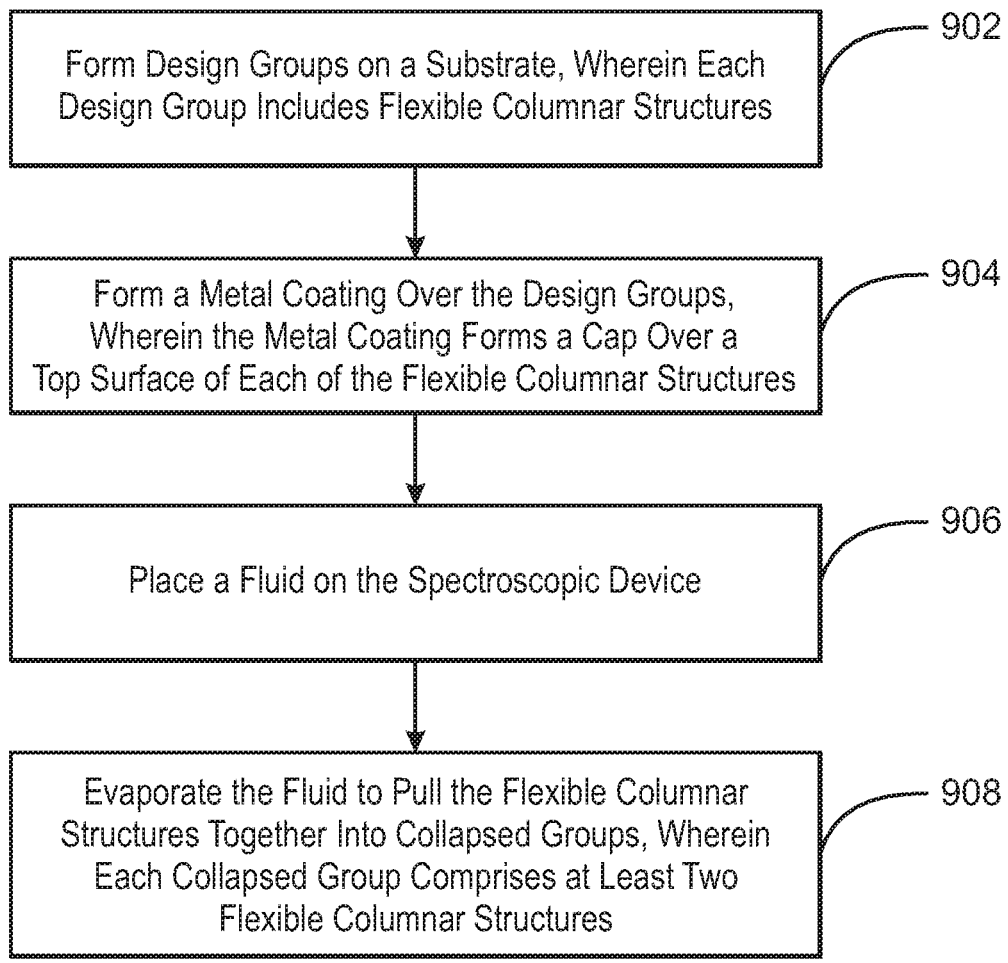
FIG. 9 is a process flow diagram of an example of a method for forming a spectroscopic device including collapsed groups patterned into design groups.

FIG. 9 is a process flow diagram of an example of a method 900 for forming a spectroscopic device including collapsed groups patterned into design groups. The method may begin at block 902, when the design groups are formed on a substrate. As described herein each design group includes flexible columnar structures, such as nanopillars, and the design groups are separated by a bare region of substrate. As described with respect to FIG. 8, the design group may be contiguous with bare regions of substrate separating portions of the design group to form corners that may enhance solvent pinning of a contact line.

At block 904, a metal coating may be formed over the design groups. The metal coating may form a metal cap over the top surface of each of the flexible columnar structures. As there are bare regions of substrate, there may be some formation of a metal layer on the substrate between the design groups. In some examples, this may be useful for adjusting the surface tension with an evaporating fluid, which may affect the solvent pinning and provide further control over the collapse process.

At block 906, a fluid may be placed on the spectroscopic device. The fluid may include analyte molecules, and other adjutants, for preparing the collapsed groups for spectroscopic analysis. At block 908, the fluid is allowed to evaporate which pulls the flexible columnar structures together into collapsed groups through microcapillary forces. Each collapsed group includes at least two flexible columnar structures. However, control of the collapse increases the probability that each collapsed group will include more flexible columnar structures. For example, the solvent pinning may lead to collapsed groups that include five flexible columnar structures in a relatively uniform arrangement within the design groups.

Figure 10:
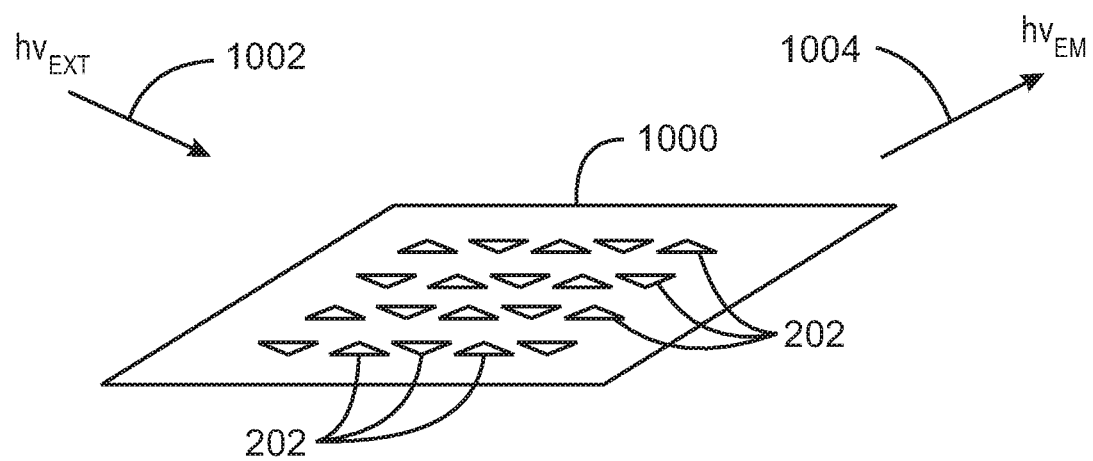
FIG. 10 is a schematic diagram of an example of using a spectroscopic device containing design groups in a spectroscopic analysis

FIG. 10 is a schematic diagram of an example of using a spectroscopic device 1000 containing design groups 202 in a spectroscopic analysis. Like numbered items are as described with respect to FIG. 2. In this example, the spectroscopic device 1000 is being probed by an excitation beam 1002 of electromagnetic radiation, for example, in a spectrophotometer or fluorimeter. The excitation beam 1002 interacts with active surfaces in the design groups 202 that may hold analyte species adsorbed by collapsed groups.

In response to the excitation beam 1002, electromagnetic radiation may be emitted from the active surfaces in the design groups 202. The characteristics of the emitted radiation 1004 may depend, at least in part, on the analyte species, providing information about the analyte species. The metal caps of the collapsed groups provide a plasmon resonance that may interact with the analyte species enhancing the spectroscopic response of the analyte species.

The excitation beam 1002 and the emitted radiation 1004 may be at wavelength ranges extending from the near ultraviolet to the near infrared. For example, this may cover a wavelength range from about 150 nanometers (nm) to about 2,500 nm. In some examples, the mid-infrared regions may be included, such as about 3 micrometers (μm) to about 50 μm. Accordingly, an analysis chip 100 may be used for surface enhanced spectroscopy (SES), such as surface enhanced Raman spectroscopy (SERS), or other surface enhanced luminescence (SEL) techniques, such as fluorimetry or infrared, among others.

As described herein, lithographic patterning of relatively large features, such as the nanopillars or other flexible columnar structures, followed by guided self-assembly during the solvent evaporation is an economical method for the production of consistent nanoparticle assemblies for spectroscopic enhancement. Coating the substrate with a metallic layer to form caps over the nanopillars may increase the interaction volume of light with the sample through plasmon resonance, leading to a greater signal from a weaker source. This may help in portable sensing solutions were a small form factor detection system is useful.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A spectroscopic device, comprising:
an analysis chip comprising a plurality of design groups on a substrate, wherein:

each design group comprises a plurality of collapsed groups arranged in a triangular formation with interlacing triangles and is separated by bare regions of substrate, wherein an edge of each design group is configured to enhance pinning of a solvent drying line at the edge of the design group;

each collapsed group comprises at least two flexible columnar structures; and each flexible columnar structure comprises a metal cap.

2. The spectroscopic device of claim 1, wherein the metal cap comprises a noble metal, gold, copper, aluminum, or silver, or any combinations thereof.

3. The spectroscopic device of claim 1, comprising a spectrophotometer configured to direct an excitation beam of electromagnetic radiation onto the analysis chip and detect an emitted beam of electromagnetic radiation from the analysis chip.

4. The spectroscopic device of claim 3, wherein the spectrophotometer comprises a surface enhanced Raman spectrophotometer.

5. The spectroscopic device of claim 3, wherein the spectrophotometer comprises a fluorimeter, or an infrared spectrophotometer.

6. A method for fabricating a spectroscopic device, comprising:

forming a plurality of design groups arranged in a triangular formation with interlacing triangles on a substrate, wherein each design group comprises a plurality of flexible columnar structures formed on the substrate, and wherein an edge of each design group is shaped to enhance pinning of a solvent drying line at the edge of the design group;

forming a metal coating over the spectroscopic device, wherein the metal coating forms a cap over a top surface of each of the plurality of flexible columnar structures;

placing a fluid on the spectroscopic device; and evaporating the fluid, wherein evaporation of the fluid exerts a microcapillary pressure that pulls the plurality of flexible columnar structures together into a plurality of collapsed groups, wherein each collapsed group comprises at least two flexible columnar structures, and wherein the pinning increases the microcapillary pressure within the design group during the evaporation.

7. The method of claim 6, comprising arranging the plurality of design groups to trigger solvent pinning at an edge of a design group.

8. The method of claim 6, comprising controlling a ratio of a bare area of substrate to an area covered by the plurality of design groups to control solvent pinning.

9. The method of claim 6, comprising selecting the fluid based, at least in part, on a free energy of a bare area to control solvent pinning.

10. The method of claim 6, comprising adding analyte molecules to the fluid prior to placing the fluid on the spectroscopic device.

11. A spectroscopic device for surface enhanced luminescence, comprising:

a plurality of design groups arranged in a triangular formation with interlacing triangles on a substrate, wherein:

each design group comprises a plurality of collapsed groups;

each collapsed group comprises at least two flexible columnar structures;

each flexible columnar structure comprises a metal cap; and a bare area of substrate separates each design group.

12. The spectroscopic device of claim 11, wherein each collapsed group comprises five flexible columnar structures.

* * * * *